United States Patent
Kourogi et al.

(10) Patent No.: US 10,527,424 B2
(45) Date of Patent: Jan. 7, 2020

(54) ESTIMATED-AZIMUTH-ANGLE ASSESSMENT DEVICE, MOBILE TERMINAL DEVICE, COMPUTER-READABLE STORAGE MEDIUM, CONTROL METHOD FOR ESTIMATED-AZIMUTH-ANGLE ASSESSMENT DEVICE, AND POSITIONING DEVICE

(71) Applicant: National Institute of Advanced Industrial Science and Technology, Tokyo (JP)

(72) Inventors: Masakatsu Kourogi, Tsukuba (JP); Takeshi Kurata, Tsukuba (JP); Tomoya Ishikawa, Tsukuba (JP); Takashi Okuma, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 510 days.

(21) Appl. No.: 14/890,278

(22) PCT Filed: May 14, 2014

(86) PCT No.: PCT/JP2014/062796
§ 371 (c)(1),
(2) Date: Mar. 24, 2016

(87) PCT Pub. No.: WO2014/185444
PCT Pub. Date: Nov. 20, 2014

(65) Prior Publication Data
US 2016/0216116 A1 Jul. 28, 2016

(30) Foreign Application Priority Data
May 14, 2013 (JP) .................. 2013-102577

(51) Int. Cl.
G01C 25/00 (2006.01)
G01C 21/12 (2006.01)
(Continued)

(52) U.S. Cl.
CPC .............. *G01C 21/12* (2013.01); *G01C 21/16* (2013.01); *G01C 25/005* (2013.01); *G01P 21/00* (2013.01)

(58) Field of Classification Search
CPC .... B41J 2/1433; B41J 2/14024; B41J 2/1404; B41J 2/1628; B41J 2/0458; B41J 2/1629; B41J 2/1623; B41J 2/14145
See application file for complete search history.

(56) References Cited

U.S. PATENT DOCUMENTS 5,941,934 A * 8/1999 Sato ................. G01C 21/30
701/446
6,470,276 B1 * 10/2002 Lansley ............. G01V 1/28
702/16

(Continued)

FOREIGN PATENT DOCUMENTS

JP 2005-114537 4/2005
JP 2012-037405 2/2012
(Continued)

OTHER PUBLICATIONS

English translation of International Preliminary Report on Patentability dated Nov. 17, 2015 for corresponding International Application No. PCT/JP2014/062796.
(Continued)

*Primary Examiner* — John C Kuan
(74) *Attorney, Agent, or Firm* — Renner, Otto, Boisselle & Sklar, LLP

(57) ABSTRACT

An angle offset judging device (1) includes: an azimuth histogram generating section (126) for obtaining an appear-
(Continued)

ance frequency of estimated azimuths; and an evaluating section (127) for making an evaluation of whether or not the appearance frequency thus obtained shows a tendency which is observed in a case where an azimuth is properly estimated under a binding condition concerning an advancing direction of a movement of a moving body.

10 Claims, 9 Drawing Sheets

(51) Int. Cl.
*G01P 21/00* (2006.01)
*G01C 21/16* (2006.01)

(56) References Cited

U.S. PATENT DOCUMENTS

| | | | | |
|---|---|---|---|---|
| 2002/0143491 A1* | 10/2002 | Scherzinger | ........... | G01C 21/16 702/160 |
| 2003/0018430 A1* | 1/2003 | Ladetto | ................. | G01C 21/16 701/472 |
| 2005/0068850 A1* | 3/2005 | Muyzert | ................ | G01V 1/286 367/38 |
| 2006/0031014 A1* | 2/2006 | Sato | ....................... | G01C 17/38 701/530 |
| 2007/0260418 A1* | 11/2007 | Ladetto | ................ | G01C 21/165 702/150 |
| 2009/0198444 A1* | 8/2009 | Takanashi | ............... | G01C 21/10 701/469 |
| 2011/0106487 A1* | 5/2011 | Kourogi | ................. | G01C 21/26 702/142 |
| 2011/0208444 A1* | 8/2011 | Solinsky | ................ | A61B 5/112 702/41 |
| 2013/0166247 A1* | 6/2013 | Akiyama | ................ | G01P 15/14 702/141 |
| 2013/0261959 A1* | 10/2013 | Kimishima | ............. | G01S 19/40 701/445 |
| 2014/0058685 A1* | 2/2014 | Buchanan | ............ | G01C 25/005 702/33 |
| 2014/0180626 A1* | 6/2014 | Kimishima | .......... | G01C 22/006 702/142 |

FOREIGN PATENT DOCUMENTS

| | | |
|---|---|---|
| JP | 2012-103024 | 5/2012 |
| JP | 2012-215547 | 11/2012 |

OTHER PUBLICATIONS

International Search Report for corresponding International Application No. PCT/JP2014/062796 dated Aug. 26, 2014.
Kourogi, Masakatsu et al., "Indoor positioning system using a self-contained sensor module for pedestrian navigation and its evaluation", Symposium "Mobile 08" Proceedings, 2008, pp. 151-156 and partial English translation (cited in the specification).

* cited by examiner

US 10,527,424 B2

ESTIMATED-AZIMUTH-ANGLE ASSESSMENT DEVICE, MOBILE TERMINAL DEVICE, COMPUTER-READABLE STORAGE MEDIUM, CONTROL METHOD FOR ESTIMATED-AZIMUTH-ANGLE ASSESSMENT DEVICE, AND POSITIONING DEVICE

TECHNICAL FIELD

The present invention relates to an estimated azimuth evaluating technology for evaluating validity of a bias component of an angular velocity.

BACKGROUND ART

The technology called pedestrian dead reckoning (PDR) has been researched and developed. According to the pedestrian dead reckoning, (i) a moving body, which is a pedestrian, holds or is equipped with a sensor module that includes an (three-axis) acceleration vector sensor and an (three-axis) angular velocity vector sensor (i.e. the sensor module is what is known as a six-axis sensor) and then (ii) a location and an attitude of the pedestrian is estimated based on an acceleration vector and an angular velocity vector which have been obtained by use of the sensor module (see, for example, Non-Patent Literature 1).

Unlike GPS (Global Positioning System) and other positioning technologies that employ wireless signals, PDR is an autonomous tracking technology in which a self-contained sensor is used. This allows the PDR to have such an advantage as being able to make a measurement even without using a special infrastructure (e.g. GPS satellite) for the measurement.

However, according to PDR, slight errors in estimating an attitude (particularly yaw azimuth) generally accumulate. This poses a problem that an error in positioning may increase in proportion to a distance for which a pedestrian has walked.

(Factors in Positioning Errors)

Of factors contributing to an increase in positioning errors, a factor considered as the greatest contributor is an error in estimating, by time integration of an angular velocity vector, an attitude angle (particularly yaw azimuth).

For example, an output from an (three-axis) angular velocity (gyro) sensor includes not only an angular velocity output component but also a zero-point offset (also called bias component). A zero-point offset is an error component that is outputted while a value of zero should be outputted.

Error components such as zero-point offsets are integrated over time, and are accumulated as errors in estimating an attitude. Of such errors, particularly integration errors of bias components of an angular velocity around a gravity axis appear as errors in an azimuth (yaw azimuth).

Therefore, there have been technologies proposed for making calibration of the error component.

For example, Patent Literature 1 discloses a server device configured such that, in a case where a moving body terminal moves from a first location to a second location which causes an amount of errors in location or angle to be a specific amount, a zero-point offset is calculated based on a difference between (i) the location or the angle obtained at the second location with the use of an output of a motion sensor and (ii) the specific amount, which difference is recognized by dead reckoning.

CITATION LIST

Patent Literature

[Patent Literature 1]
Japanese Patent Application Publication, Tokukai, No. 2012-215547 (Publication Date: Nov. 8, 2012)
[Patent Literature 2]
Japanese Patent Application Publication, Tokukai, No. 2005-114537 (Publication Date: Apr. 28, 2005)
[Non-Patent Literature]
[Non-Patent Literature 1]
Masakatsu KOUROGI, Takashi OKUMA, and Takeshi KURATA, "Indoor positioning system using a self-contained sensor module for pedestrian navigation and its evaluation", Symposium "Mobile 08" Proceedings, 2008, pp 151-156

SUMMARY OF INVENTION

Technical Problem

However, according to calibration disclosed in Patent Literature 1, it is necessary to (i) provide an anchor location where an angle from a reference point is known and (ii) estimate an error component in angular velocity.

The present invention has been made in view of the problem, and it is an object of the present invention to provide an estimated azimuth evaluating device and the like capable of evaluating, under a binding condition in which a moving direction of a moving body has a bias, validity of an error component of an estimated angular velocity even without measuring the error component in advance.

Solution to Problem

In order to attain the object, an estimated azimuth evaluating device of the present invention includes: an angular velocity obtaining section for obtaining an angular velocity around a gravity axis during a movement of a moving body, which angular velocity has been measured by a three-axis angular velocity sensor; a bias component candidate generating section for generating a candidate for a bias component of the three-axis angular velocity sensor; an estimating section for estimating an estimated azimuth of the movement of the moving body in accordance with (i) the angular velocity obtained by the angular velocity obtaining section and (ii) the candidate for the bias component; an appearance frequency obtaining section for obtaining an appearance frequency of estimated azimuths; and an evaluating section for making an evaluation of whether or not the appearance frequency obtained by the appearance frequency obtaining section shows a tendency which is observed in a case where an azimuth is properly estimated under a binding condition concerning an advancing direction of the movement of the moving body.

In order to attain the object, an estimated azimuth evaluating device controlling method of the present invention includes: (a) obtaining an angular velocity around a gravity axis during a movement of a moving body, which angular velocity has been measured by a three-axis angular velocity sensor; (b) generating a candidate for a bias component of the three-axis angular velocity sensor; (c) estimating an estimated azimuth of the movement of the moving body in accordance with (i) the angular velocity obtained in the step (a) and (ii) the candidate for the bias component; (d) obtaining an appearance frequency of the estimated azimuth;

and (e) making an evaluation of whether or not the appearance frequency obtained in the step (d) shows a tendency which is observed in a case where an azimuth is properly estimated under a binding condition concerning an advancing direction of the movement of the moving body.

Advantageous Effects of Invention

With an estimated azimuth evaluating device and an estimated azimuth evaluating device controlling method of the present invention, it is possible to evaluate validity of an error component (bias component) of an estimated angular velocity even without measuring the error component in advance.

DESCRIPTION OF EMBODIMENTS

Embodiment 1

The following description will discuss an embodiment of the present invention with reference to FIGS. 1 through 4 and FIG. 9.

(Overview)

Figure 1:
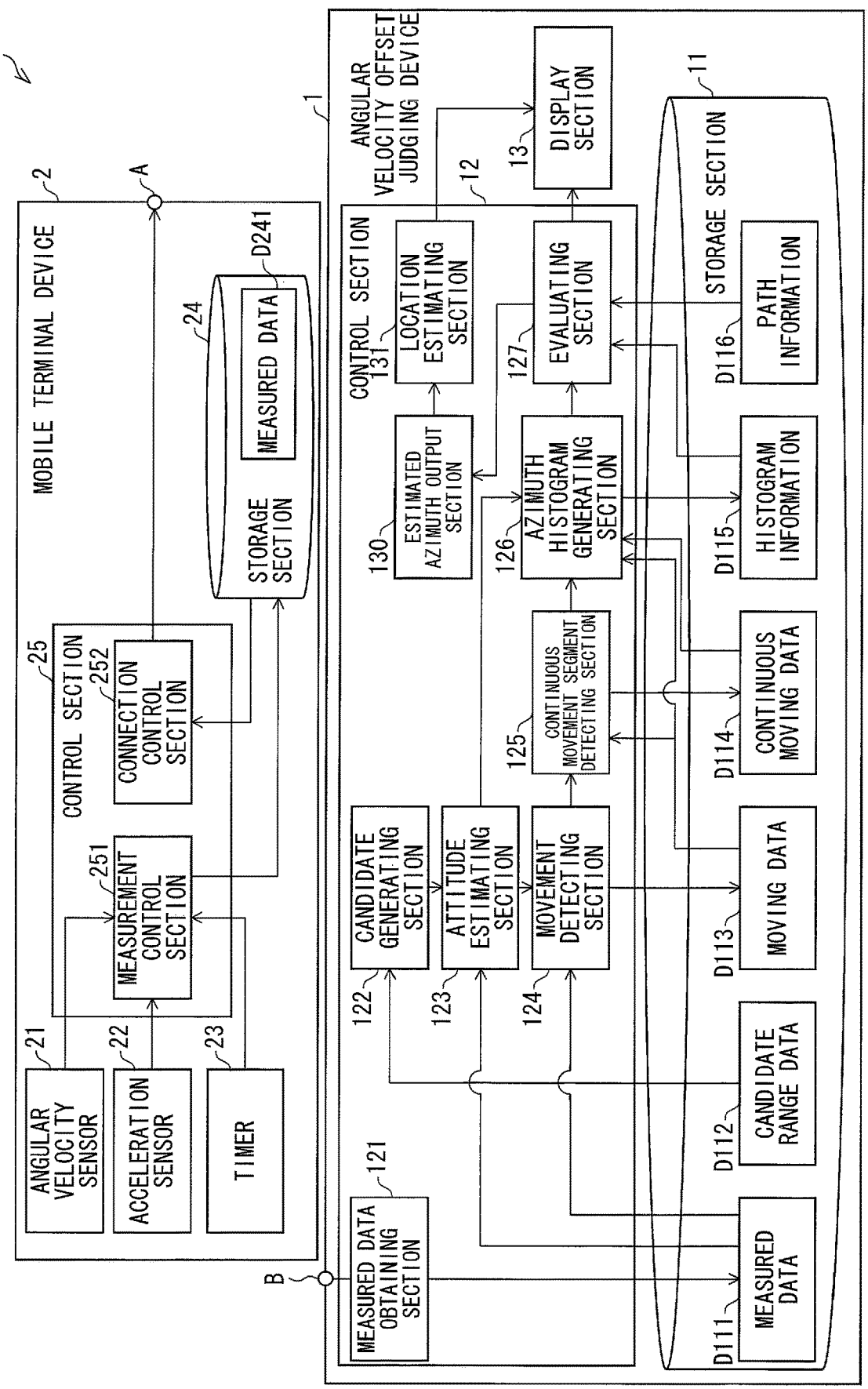
FIG. 1 is a functional diagram illustrating a configuration of a positioning system in accordance with an embodiment of the present invention. The positioning system includes a mobile terminal device and an angular velocity offset judging device.

A positioning system SYS1 in accordance with an embodiment of the present invention will be first described with reference to FIG. 1. FIG. 1 is a functional diagram schematically illustrating a configuration of the positioning system SYS1. As illustrated in FIG. 1, the positioning system SYS1 includes two constituent elements. Specifically, the positioning system SYS1 includes a mobile terminal device 2 and an angular velocity offset judging device 1.

The mobile terminal device 2 and the angular velocity offset judging device 1 are connected so as to be able to establish data communication with each other via (i) an external connection interface A of the mobile terminal device 2 and (ii) an external connection interface B of the angular velocity offset judging device 1.

A connection between the external connection interfaces A and B can be a wired connection or a wireless connection. Examples of the external connection interfaces A and B, in a case of a wired connection, encompass USB (Universal Serial Bus). Examples of the external connection interfaces A and B, in a case of a wireless connection, encompass Bluetooth (registered trademark), IEEE802.11 wireless, and NFC (Near Field Communication).

The mobile terminal device 2 is attached to a moving body (e.g. a pedestrian or a vehicle) so as to make a measurement by use of various sensors mounted on the mobile terminal device 2. The moving body is not limited to any particular one, provided that a movement of the moving body can be detected by a sensor module.

The angular velocity offset judging device 1 makes an attitude estimate in accordance with measured data which has been supplied from the mobile terminal device 2. The attitude estimate is to be made in accordance with data measured by various sensors. The angular velocity offset judging device 1 also judges whether or not a result of the attitude estimation is valid.

According to the positioning system SYS1, the mobile terminal device 2 serves as a so-called data logger, and only makes measurements. The mobile terminal device 2 is connected to the angular velocity offset judging device 1 so that the angular velocity offset judging device 1 reads out the measured data from the mobile terminal device 2. In accordance with the measured data thus read out, the angular velocity offset judging device 1 makes the attitude estimate and the angle offset judgment.

(Mobile Terminal Device)

More specifically, the mobile terminal device 2 includes an angular velocity sensor 21, an acceleration sensor 22, a timer 23, a storage section 24, and a control section 25.

The angular velocity sensor 21 is capable of measuring at least an angular velocity around a gravity axis. The angular velocity sensor 21 can be realized by, for example, an angular velocity (gyro) sensor capable of measuring a three-axis angular velocity vector.

The acceleration sensor 22 is capable of identifying a direction in which gravitational force is exerted. The acceleration sensor 22 can be capable of measuring, for example, a three-axis acceleration vector.

The timer 23 is capable of identifying absolute time or relative time at which each of the sensors makes a measurement. Note that any timer can be employed as the timer 23, so long as it is capable of identifying at least relative time at which the angular velocity sensor measured an angular velocity. The timer 23 can be realized by, for example, an electronic component such as an RTC (Real-time clock).

The storage section 24 stores therein, for a predetermined period of time or longer, measured data with which pieces of data, outputted from respective of the angular velocity sensor 21, the acceleration sensor 22, and the timer 23, are associated. The measured data is data with which the following pieces of information are associated: (i) an angular velocity vector measured by the angular velocity sensor 21, (ii) an acceleration vector measured by the acceleration sensor 22, and (iii) time recognized by the timer 23. The storage section 24 can be realized by, for example, a hard disk or an SSD (Solid State Drive) which is mounted on the mobile terminal device 2. Alternatively, the storage section 24 can also be realized by a removable external storage device such as a micro SD card.

The control section 25 totally controls the mobile terminal device 2. More specifically, the control section 25 includes a measurement control section 251 and a connection control section 252.

The measurement control section 251 (i) obtains pieces of output data from respective of the angular velocity sensor 21, the acceleration sensor 22, and the timer 23, and (ii) controls the storage section 24 to store the measured data D241 with which the pieces of output data thus obtained are associated.

In a case where the mobile terminal device 2 is connected to the angular velocity offset judging device 1 via the external connection interface A, the connection control section 252 controls the angular velocity offset judging device 1 to receive, from the storage section 24, the measured data D241.

(Angular Velocity Offset Judging Device)

The angular velocity offset judging device 1, more specifically, includes a storage section 11, a control section 12, and a display section 13.

The storage section 11 stores various pieces of data to be used by the angular velocity offset judging device 1. The storage section 11 can be realized by, for example, a hard disk or an SSD (Solid State Drive) which is mounted on the angular velocity offset judging device 1. Alternatively, the storage section 11 can also be realized by a removable external storage device such as a micro SD card. The data to be stored in the storage section 11 will be described later in detail.

The control section 12 totally controls the angular velocity offset judging device 1. A more specific configuration of the control section 12 will be described later.

The display section 13 controls, in accordance with image data transmitted from the control section 12, a display screen to display various pieces of information such as text, an image and a graph.

(Details of Storage Section)

The storage section 11, more specifically, stores measured data D111, candidate range data D112, moving data D113, continuous moving data D114, histogram information D115, and path information D116.

The measured data D111 is associated with (i) an angular velocity vector, (ii) an acceleration vector, and (iii) time at which the angular velocity is measured and time at which the acceleration vector is measured.

The candidate range data D112 sets a range of angular velocity offset values that should be judged.

The moving data D113 includes (i) information indicative of a time point at which a moving body can be considered to have moved by one unit on a time sequence of measured data and (ii) information indicative of an azimuth at the time point. The following description will discuss, for convenience, a case where (i) the moving body is a person and (ii) the person moves by walking. Therefore, the moving data D113 can be described as information indicative of a time point at which a person has moved by one step.

The continuous moving data D114 is information indicative of a continuous movement segment on a time sequence of measured data, during which continuous movement segment a moving body continuously moved in a certain direction. The following description will illustrate the continuous moving data D114 with information indicative of a continuous movement segment during which a person moved for a predetermined number of steps. The predetermined number of step (n-steps) can be set to any number of steps. For example, the predetermined number of steps can be set to 5 steps.

Figure 3:
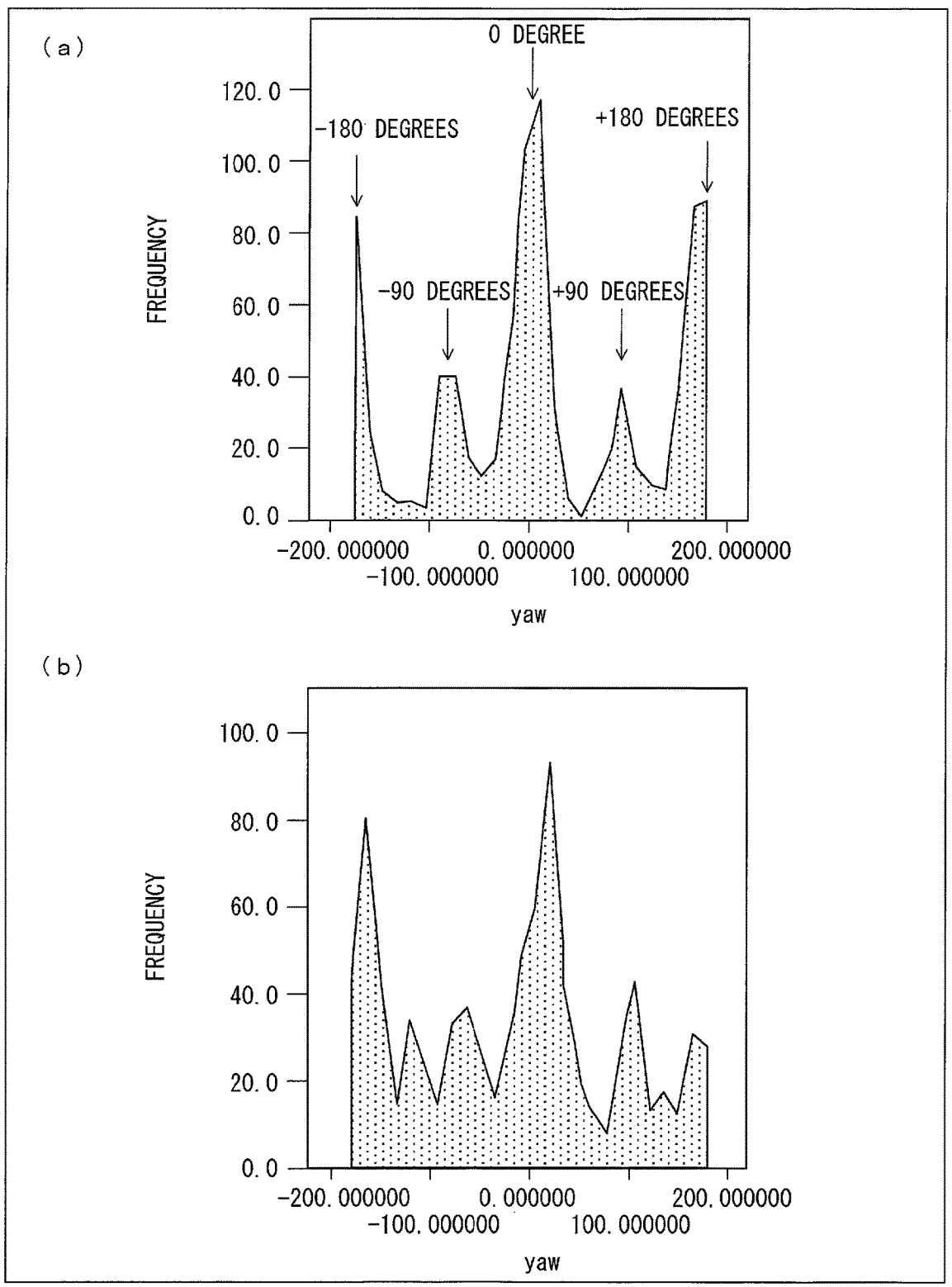
FIG. 3 is a set of views (a) and (b) for describing histogram information.

The histogram information D115 is indicative of an appearance frequency at which a yaw azimuth appears during the continuous movement segment. A concrete example of the histogram information D115 is shown in FIG. 3. Histograms shown in respective (a) and (b) of FIG. 3 are each defined by (i) a horizontal axis which represents a yaw azimuth (yaw) and (ii) a vertical axis which represents an appearance frequency (occurrence rate) at which the yaw azimuth appears. FIG. 3 will be described later in detail.

Figure 2:
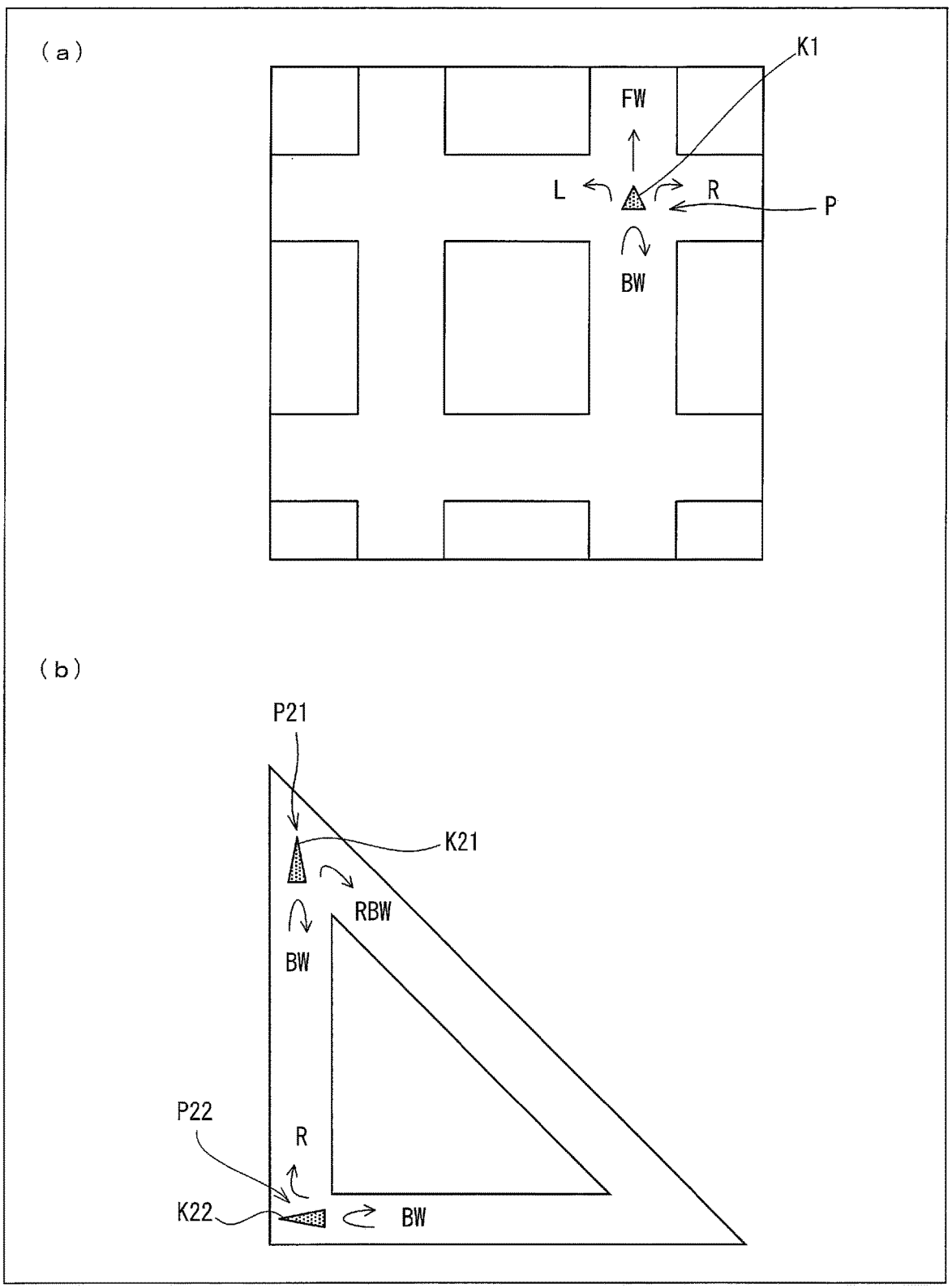
FIG. 2 is a set of views (a) and (b) for describing path information.

The path information D116 is geographical information indicative of a region in which a moving body can move. The path information D116 indicates, for example, (i) how paths are arranged and (ii) how the paths are connected to each other. Note that the region, in which the moving body can move, is preferably a set of paths in which an azimuth of the moving body is limited to some extent. From another point of view, the path information D116 can be information indicative of conditions for arranging the paths in which the moving body can move. The path information D116, more specifically, can be information indicative of paths as illustrated in FIG. 2. (a) of FIG. 2 illustrates a movable region in which paths are arranged in a grid manner. (b) of FIG. 2 illustrates a path arranged in a form of an isosceles triangle.

(Details of Control Section)

The control section 12, specifically, includes a measured data obtaining section 121, a candidate generating section (bias component candidate generating section) 122, an attitude estimating section (estimating section) 123, a movement detecting section (estimating section) 124, a continuous movement segment detecting section (movement detecting section) 125, an azimuth histogram generating section (appearance frequency obtaining section) 126, and an evaluating section (estimated azimuth output section) 127. The control section 12 can further include (i) an estimated azimuth output section 130 for outputting an estimated azimuth in accordance with moving data, an estimated attitude, and an evaluation of the evaluating section 127 and (ii) a location estimating section 131 for estimating a location of a moving body in accordance with the estimated azimuth.

The measured data obtaining section 121 (i) obtains measured data from the mobile terminal device 2 to which the angular velocity offset judging device 1 is connected via the external connection interface B and then (ii) causes the measured data to be stored in the storage section 11.

The candidate generating section 122 generates a candidate for a zero-point offset. Specifically, the candidate generating section 122 generates a candidate for a zero-point offset within a range specified by candidate range data D112. In a case where the candidate range data D112 specifies a range of ±0.005 [rad/s], the candidate generating section 122 generates, within the range, a candidate for a zero-point offset with a predetermined resolution. For example, in a case where a resolution for a yaw azimuth is 0.001 [rad/s], the candidate generating section 122 generates ten different candidates for a zero-point offset. Note that the candidate generating section 122 can estimate a zero-point offset by use of a conventional technology. The zero-point offset can be estimated by employing, for example, the technology disclosed in Non-Patent Literature 1. Alternatively, the candidate generating section 122 can generate a candidate for a zero-point offset within a predetermined range in which an estimated zero-point offset is centered (e.g. the range specified by the candidate range data D112).

The attitude estimating section 123 makes an estimate of a three-dimensional attitude (in a world coordinate system) of a moving body in accordance with an angular velocity vector (of three axes) and with an acceleration vector (of three axes). Specifically, the attitude estimating section 123 estimates the three-dimensional attitude of the moving body in accordance with (i) a calibrated angular velocity vector estimated by applying a zero-point offset to an angular velocity vector contained in the measured data D111 and (ii) an acceleration vector contained in the measured data D111.

The attitude estimating section 123 can further estimate a yaw azimuth by identifying a gravity axis in accordance with the acceleration vector. For example, the attitude estimating section (gravity axis judging section) 123 can judge which of the three sensor axes of the angular velocity sensor matches the gravity axis. Alternatively, the attitude estimating section 123 can make an estimate of the attitude by use of measured data which is obtained in a case where any one of the three axes of the angular velocity sensor matches the gravity axis.

The following description will further discuss how the gravity axis is identified. In many cases, a package for carrying or accommodating an angular velocity sensor has a rectangular parallelepiped form. Therefore, in a case where a pedestrian wears such a package, a certain sensor axis often matches a gravity axis. In addition, it is possible to verify, by use of measured data of an (three-axis) acceleration sensor and an (three-axis) angular velocity sensor, a degree to which the certain sensor axis and the gravity axis match. Examples of a technology for estimating a gravitational azimuth vector (gravity axis) by combination of an (three-axis) acceleration sensor and an (three-axis) angular velocity sensor encompass the technology disclosed in Non-Patent Literature 1. By use of such a technology, the attitude estimating section 123 can verify whether or not any one of the sensor axes matches the gravity axis.

The movement detecting section 124 (i) identifies presence/absence of a movement of a moving body, in accordance with an angular velocity vector and an acceleration vector included in measured data which has been obtained during a predetermined segment (predetermined period) and (ii) outputs a result of the identification. The movement detecting section 124 herein identifies, as an example, presence/absence of a walking motion of a pedestrian. Specifically, the movement detecting section 124 identifies the presence/absence of the walking motion by combining (i) the angular velocity vector, (ii) the acceleration vector, and (iii) a result of estimation of a three-dimensional attitude of the moving body, which result has been supplied from the attitude estimating section 123. The identification of the presence/absence of the walking motion can be carried out by use of, for example, the technology disclosed in Patent Literature 2.

The movement detecting section 124 (i) calculates a representative azimuth of one walking motion in accordance with measured data used for identifying the one walking motion and (ii) designates the representative azimuth as an azimuth of the walking motion.

In a case where a movement of a moving body is a walking motion, a frequency of the walking motions is approximately 1 Hz to 3 Hz. For convenience, the frequency of the walking motions is assumed to be 2 Hz. Then, in a case where pieces of measured data are sampled at 100 Hz, the number of pieces of measured data to be used for detecting one walking motion is 50. In this case, a representative azimuth during one walking motion can be calculated in accordance with 50 pieces of measured data. Examples of the representative azimuth encompass a central value, an average value, and a median of an azimuth estimated during a segment in which a walking motion is detected. Alternatively, it is possible to use, instead of calculating a representative azimuth, all of measured data which has been sampled during generating of histogram information (described later).

The movement detecting section 124 generates moving data D113, and then stores the moving data D113 in the storage section 11. The moving data D113 indicates (a) a time point at which a walking motion is detected and (b) a representative azimuth at the time point.

The continuous movement segment detecting section 125 extracts, in accordance with an output of the movement detecting section 124, a time segment (period) during which the moving body can be considered to be moving. Specifically, the continuous movement segment detecting section 125 first identifies whether or not the moving body has made a movement of two continuous steps. A segment, during which the moving body made a movement of two continuous steps, is a segment during which a given walking motion and a following walking motion detected next are continuous.

As has been described, the frequency of walking motions is approximately 1 Hz to 3 Hz. Therefore, in a case where a walking motion is detected one second or less after a previous walking motion has been detected, these two walking motions can be considered continuous.

Then, the continuous movement segment detecting section 125 detects a continuous movement segment during which a predetermined number (e.g. 5) of walking motions are continuous. Specifically, the continuous movement segment detecting section 125 extracts a continuous movement segment during which a predetermined number of segments, during each of which the moving body has made a movement of two continuous steps, are continuous (e.g. a segment during which the moving body has made a movement of five continuous steps).

The continuous movement segment detecting section 125 (i) generates continuous moving data D114 indicative of the continuous movement segment and then (ii) registers the continuous moving data D114 in the storage section 11.

The azimuth histogram generating section 126 collects appearance frequencies of azimuths of respective walking motions during a continuous movement segment so as to generate a histogram. Specifically, the azimuth histogram generating section 126 (i) extracts a piece of moving data D113, which piece corresponds to the continuous movement segment indicated by the continuous moving data D114 and (ii) collects frequencies of azimuths indicated by the moving data D113 thus extracted. Note that the number of samples of walking motions to be used for generating the histogram preferably corresponds to approximately 1000 steps.

The evaluating section 127 evaluates whether or not an estimated azimuth is proper. From another point of view, the evaluating section 127 evaluates whether or not a zero-point offset used for estimating the azimuth is proper. The following description will discuss in detail how an evaluation is made by the evaluating section 127.

The evaluating section 127 first judges whether or not the histogram, generated by the azimuth histogram generating section 126, indicates a pattern which appears in a case where a moving body moves. That is, the evaluating section 127 judges whether or not the histogram thus generated indicates a tendency identical to a tendency of a frequency distribution of azimuths that appear in a case where a zero-point offset is properly estimated. The evaluating section 127, for example, can (i) obtain, in advance, geographical information on a region in which the moving body moved (i.e. path information D116) and then (ii) evaluate the histogram by use of the geographical information thus obtained. This will be described below in detail with reference to FIG. 2.

In general office environment, factory, and/or living environment, paths on which it is possible to move by walking are often arranged systematically. In such places, paths are often arranged in a grid manner as illustrated, for example, in (a) of FIG. 2.

Paths, arranged as illustrated in (a) of FIG. 2, give a bias to azimuths of continuous movements of a moving body K1 by walking. For example, in a case where the moving body K1 faces a forward direction FW at a connection point (crossroads) P1 of the paths, a moving direction of the moving body K1 is one of (1) the forward direction FW, (2) a rightward direction R, (3) a leftward direction L, and (4) a backward direction BW.

An azimuth of the continuous movement of the moving body K1 by walking therefore increases the frequency of becoming −180 degrees, −90 degrees, 0 degree, 90 degrees, and 180 degrees, where (i) an advancing direction is 0 degree and (ii) a clockwise yaw azimuth is positive.

In such a case, peaks in a histogram tend to appear in 90 degree increments if an azimuth is properly estimated. Therefore, if an azimuth is properly estimated, then a histogram, having peaks sharply pointing toward respective predetermined azimuths, should be obtained (see (a) of FIG. 3).

The evaluating section 127 (i) reads out the path information D116 from the storage section 11 and (ii) analyzes the path information D116 so as to identify directions in which the moving body K1 is likely to move (i.e. identify a bias or a tendency of the appearance frequency of the azimuths). Note that the evaluating section 127 can externally obtain path information D116 via a communications network or the like. Alternatively, the evaluating section 127 can obtain, instead of path information D116, information which indicates a bias (tendency) of the appearance frequency of the movements of the moving body K1.

The evaluating section 127 also evaluates whether or not the histogram shows such a bias (tendency) of the appearance frequency of the azimuths of the movement.

Specifically, the evaluating section 127 can evaluate, for example, whether or not a level of sharpness (kurtosis) of a peak in an azimuth having an appearance frequency that should be high in a histogram, is higher than a predetermined value (threshold). Alternatively, the evaluating section 127 can evaluate how high the level of sharpness of the peak is. In a case where an azimuth is properly estimated, the level of sharpness of a peak in a predetermined azimuth becomes high.

On the other hand, in a case where an azimuth is not properly estimated, a histogram appears for example as illustrated in (b) of FIG. 3 where (i) the level of sharpness (kurtosis) of a peak becomes low or (ii) bottom parts of the histogram are broadened altogether. Specifically, in a case where an error in azimuth is noticeably increased due to accumulated errors in zero-point offset, (i) the kurtosis of the above-described peak becomes low, (ii) a peak level of the above-described peak becomes so low that the peak is undetectable, or (iii) a peak appears in another azimuth.

Note that in a case where paths are arranged as illustrated in (b) of FIG. 2, a moving body K21 moves in an obliquely from behind, i.e., in a direction RBW or in a backward direction BW at a location P21 where paths intersect each other at a narrow angle (45 degrees). In this case, peaks should appear in respective azimuths of −180 degrees, 135 degrees, and 180 degrees in a histogram.

Note also that, at a location where paths are orthogonal to each other, the moving body K22 moves in a rightward direction R or in the backward direction BW. In this case, peaks should appear in respective azimuths of −180 degrees, 90 degrees, and 180 degrees in a histogram.

In a case where paths are arranged as illustrated in (b) of FIG. 2, a histogram is preferably evaluated in view of such bias of azimuths. That is, it is preferable to evaluate (i) whether or not peaks in the histogram appear in the respective azimuths and (ii) whether or not kurtosis of each of the peaks is equal to or higher than a predetermined threshold.

The evaluating section 127 evaluates, in accordance with a result of evaluation of kurtosis in a histogram, whether or not an estimated azimuth is proper. Specifically, in a case where there appears a histogram whose peaks are sharp in conformity with geographical information, the evaluating section 127 can judge that the estimated azimuth is proper. The evaluating section 127 can further (i) evaluate, in accordance with the kurtosis of the peaks, how proper the estimated azimuth is and then (ii) output a result of the evaluation. The evaluating section 127 can further cause the result of the evaluation and the histogram to be displayed on the display section 13.

The estimated azimuth output section 130 can output an estimated azimuth in accordance with the evaluation. For example, the estimated azimuth output section 130 can output, in accordance with the result of the evaluation carried out by the evaluating section 127, an azimuth(s) which, of all the evaluated estimated azimuths in the histogram, is/are evaluated to be equal to or higher than a predetermined threshold. Alternatively, the estimated azimuth output section 130 can output an azimuth which is estimated to be highest in value among all the estimated azimuths in the histogram.

Note that the above description discussed (i) the attitude estimate made by the angular velocity offset judging device 1 and (ii) the validity of the attitude estimate (evaluation process) made by the angular velocity offset judging device 1. However, Embodiment 1 is not limited as such. The angular velocity offset judging device 1 can further cause, by use of the above-described attitude estimate or the like, the location estimating section 131 to make an estimate of a location of a moving body.

(Flow of Process)

Figure 4:
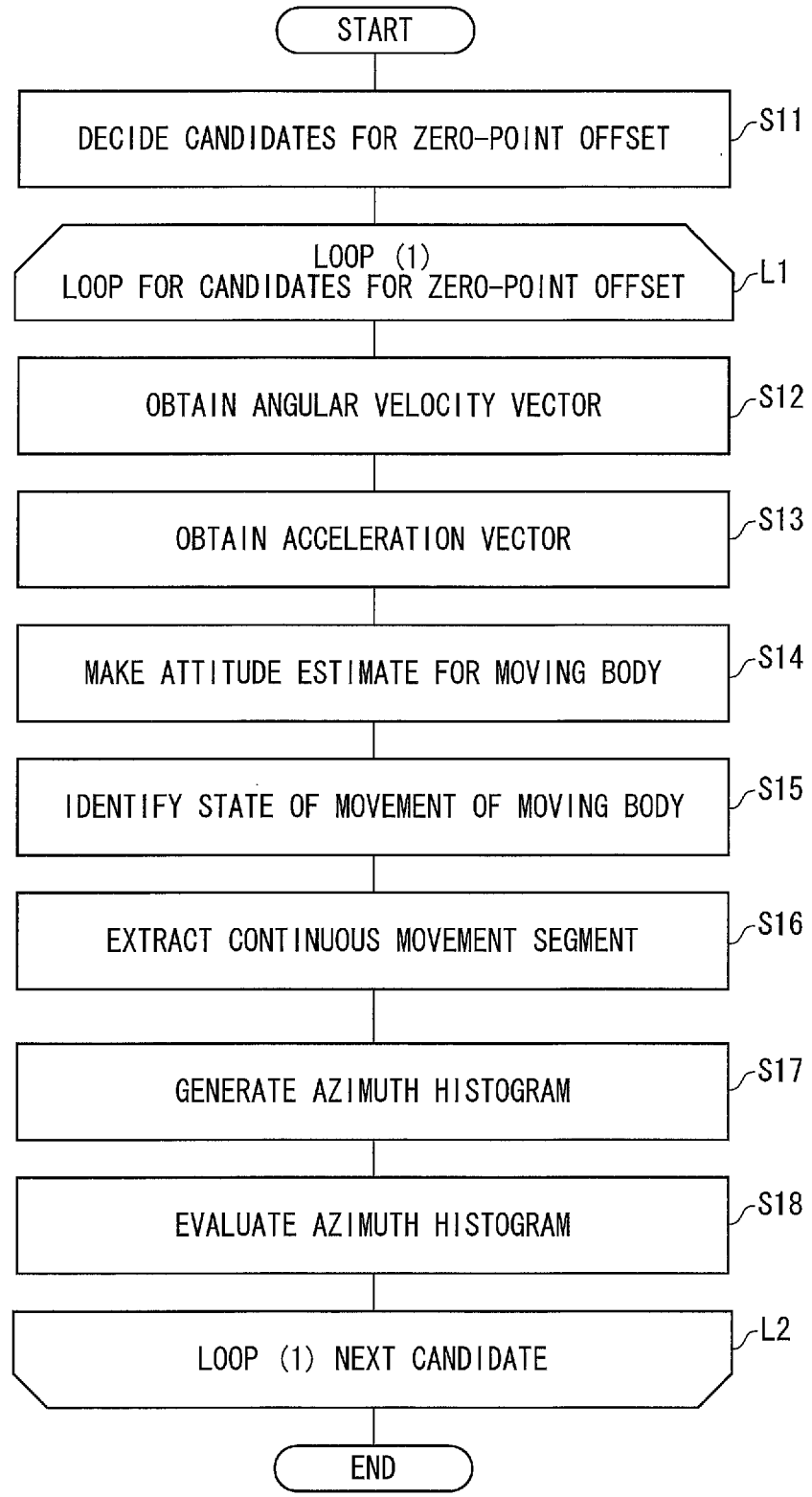
FIG. 4 is a flow chart illustrating a flow of a process carried out by the angular velocity offset judging device.

A flow of how the zero-point offset is judged by the angular velocity offset judging device 1 will be described below with reference to FIG. 4. FIG. 4 is a flow chart illustrating the flow of how the angular velocity offset judging device 1 judges the zero-point offset. Note that the following description assumes that the angular velocity offset judging device 1 obtains measured data from the mobile terminal device 2.

First, the candidate generating section 122 (i) decides, in accordance with candidate range data, a range of candidates for a zero-point offset to be generated and (ii) generates candidates within such a range (S11).

Then, a loop concerning the candidates for the zero-point offset is proceeded with, which candidates have been generated by the candidate generating section 122 (L1).

Next, the attitude estimating section 123 and the movement detecting section 124 (i) obtain an angular velocity vector from measured data D111 which has been stored in the storage section 11 (S12) (angular velocity obtaining step) and (ii) obtain an acceleration vector from the measured data D111 (S13).

Next, the attitude estimating section 123 makes an attitude estimate of a moving body, in accordance with (i) a calibrated angular velocity vector to which a candidate for the zero-point offset has been applied and (ii) the acceleration vector (S14).

Next, the movement detecting section 124 identifies a state of movement of the moving body (S15). Specifically, in accordance with a result of the attitude estimate, the movement detecting section 124 (i) detects the movement (walking motion) of the moving body and (ii) identifies an azimuth of the movement (estimating step).

Next, the continuous movement segment detecting section 125 extracts a continuous movement segment of the moving body (S16). Specifically, the continuous movement segment detecting section 125 first detects, in accordance with the movement (walking motion) detected by the movement detecting section 124, a segment during which the moving body makes a walking motion of two continuous steps. Then, the continuous movement segment detecting section 125 extracts, in accordance with moving data D113, a continuous movement segment during which the moving body makes a walking motion of continuous n steps. The continuous movement segment detecting section 125 further (i) generates continuous moving data which concerns the continuous movement segment thus extracted and (ii) registers the continuous moving data in the storage section 11.

Next, the azimuth histogram generating section 126 (i) generates a histogram by calculating an appearance frequency of azimuths of respective walking motions, the appearance frequency concerning the segment which is indicated by the continuous moving data and during which the moving body has made the walking motions of the continuous n steps and (ii) causes the histogram as histogram information to be stored in the storage section 11 (S17) (appearance frequency obtaining step).

In addition, the evaluating section 127 evaluates the histogram (S18) (evaluating step). The evaluating section 127 can further judge, in accordance with a result of the evaluation of the histogram, whether or not an estimated azimuth is proper. That is, the evaluating section 127 can judge whether or not an estimated zero-point offset is proper.

Upon completion of the above-described steps (L2), the loop L1 is proceeded with, and then the steps S12 through S18 are further proceeded with for a next candidate for the zero-point offset.

Upon completion of the loop (1) for all the candidates for the zero-point offset, the zero-point offset judging process ends.

Note that the evaluating section 127 can (i) identify, in accordance with the result of the evaluation made in the zero-point offset judging process, a candidate which, of all the candidates for the zero-point offset, allows the azimuth to be estimated most properly and (ii) output such a candidate. For example, the evaluating section 127 can extract a zero-point offset for which kurtosis in a histogram is evaluated to be a highest level.

Alternatively, it is possible to end the loop (1) at a time point at which an azimuth, that bring a result of evaluation equal to or higher than a predetermined one, is detected. For example, it is possible to (i) end the loop (1) at a time point at which an azimuth in the histogram is detected, which azimuth causes the level of kurtosis to be equal to or higher than a predetermined threshold and then (ii) make a measurement of the moving body by use of such an azimuth.

(Working Effects and Advantages)

As has been described, the angle offset judging device 1 (estimated azimuth evaluating device, positioning device) is configured to include: a measured data obtaining section 121 (angular velocity obtaining section) for obtaining an angular velocity around a gravity axis during a movement of a moving body, which angular velocity has been measured by an angular velocity sensor 21 (three-axis angular velocity sensor); a candidate generating section 122 (bias component candidate generating section) for generating a candidate for a bias component of the three-axis angular velocity sensor; an attitude estimating section 123 and a movement detecting section 124 (estimating section), the attitude estimating section 123 being configured to estimate an estimated azimuth of the movement of the moving body in accordance with (i) the angular velocity obtained by the measured data obtaining section 121 and (ii) the candidate for the bias component and the detecting section 124 being configured to calculate a representative estimated azimuth during the movement of the moving body; an azimuth histogram generating section 126 (appearance frequency obtaining section) for obtaining an appearance frequency of estimated azimuths; and an evaluating section 127 (evaluating section) for making an evaluation of whether or not the appearance frequency obtained by the azimuth histogram generating section 126 shows a tendency which is observed in a case where an azimuth is properly estimated under a binding condition concerning an advancing direction of the movement of the moving body.

This brings about an effect of being able to evaluate an error component (bias component) of an estimated angular velocity even without measuring the error component in advance. Note that in the example above, candidates for a zero-point offset are evaluated by use of a histogram. However, the evaluation is not limited to the example, provided that the evaluation can be made depending on whether or not a distribution of the azimuth shows a tendency which is observed in a case where the azimuth is properly estimated under a predetermined binding condition concerning an advancing direction of the moving body.

(Variation)

Figure 9:
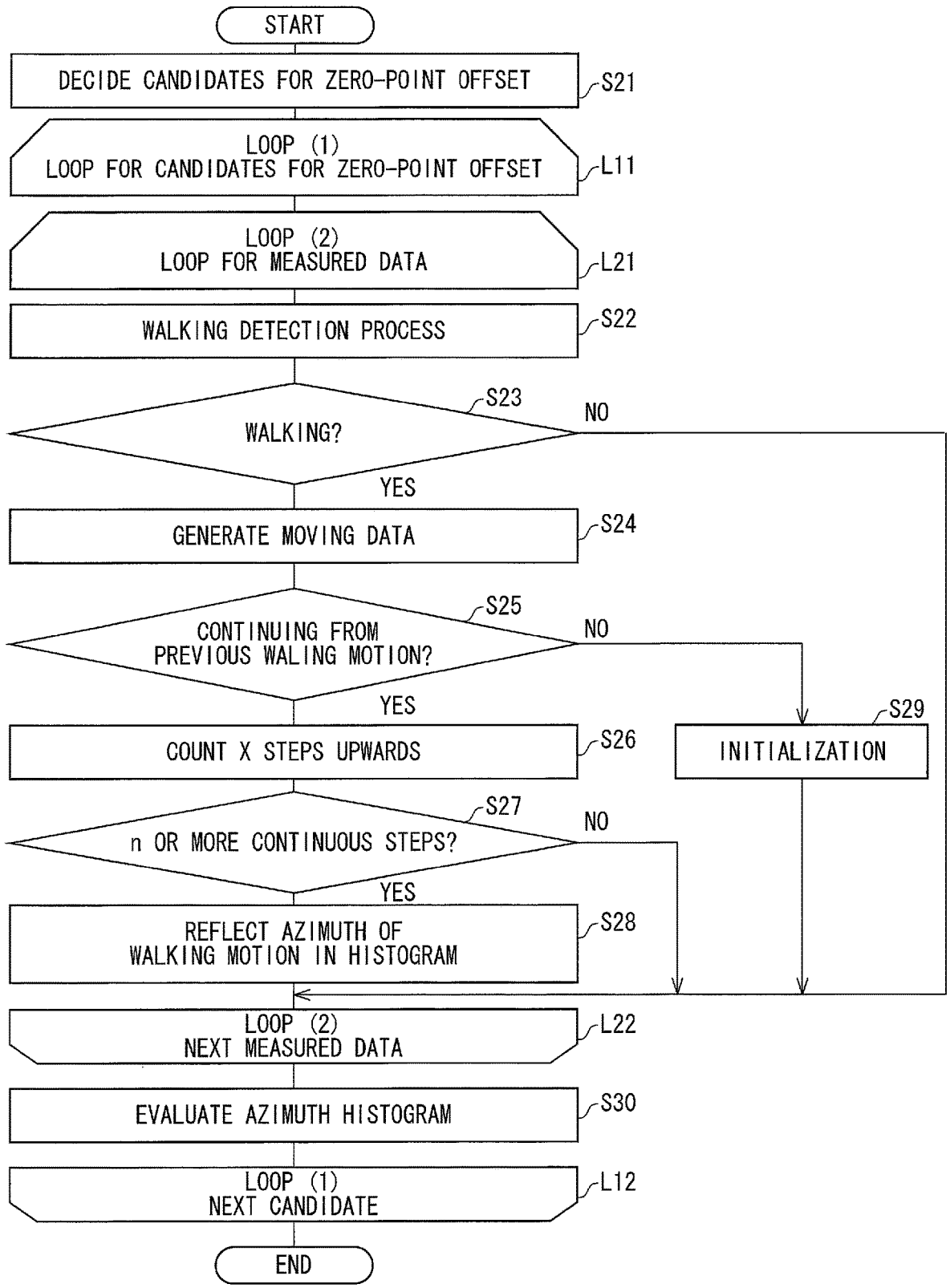
FIG. 9 is a flow chart illustrating a flow of a process carried out by an angular velocity offset judging device in accordance with an embodiment of the present invention.

The operation of the steps S11 through S18, in the flow chart illustrated in FIG. 4, was described as a process in which the steps were carried out one after another so that a main flow of the operation was made clear. Note, however, that the operation can be realized by a flow as illustrated in FIG. 9. Specifically, the steps S11 through S18, in the flow chart illustrated in FIG. 4, can be alternatively realized by a flow having branches as described below.

As illustrated in FIG. 9, the candidate generating section 122, first, (i) decides, in accordance with candidate range data, a range of candidates for a zero-point offset to be generated and (ii) generates candidates within such a range (S21).

Then, (i) a loop concerning the candidates for the zero-point offset is proceeded with, which candidates have been generated by the candidate generating section 122 (L11) and (ii) a loop (2) is further proceeded with concerning measured 15 data (L21). Note that the number of samples of the measured data can be, for example, a number which allows walking motions of approximately 1,000 steps to be detected. That is, the number of the samples of the measured data can be approximately 50,000.

In a loop (2), the movement detecting section 124 first carries out a walking detection process (S22). In a case where a walking motion has not been detected (NO in S23), a next piece of measured data is obtained (L22) and a next loop (L21) is initiated.

On the other hand, in a case where the walking motion has been detected (YES in S23), the movement detecting section 124 generates moving data in accordance with measured data used for detecting a given walking motion (S24).

Next, the continuous movement segment detecting section 125 judges whether or not the given walking motion thus detected continues from a previous walking motion followed by the given walking motion (S25).

In a case where the given walking motion continues from the previous walking motion in the step S25 (YES in S25), the continuous movement segment detecting section 125 counts X steps up (S26) and then judges whether or not the walking motion is of n or more continuous steps (S27).

In a case where the walking motion is of n or more continuous steps in the step S27 (YES in S27), the azimuth histogram generating section 126 reflects, in a histogram, azimuths of moving data D113, which belongs to a continuous movement segment (S28). Then, the beginning of the loop (2) is proceeded (L21), so that a process is carried out with respect to a next piece of measured data.

On the other hand, in a case where the walking motion is not of n or more continuous steps in the step S27 (NO in S27), the beginning of the loop (2) is proceeded (L21), so that a process is carried out with respect to a next piece of measured data.

In a case where the given walking motion does not continue from the previous walking motion in the step S25 (NO in S25), the X steps are initialized to be zero (S29). Then, the process returns to the beginning of the loop (2) (L21), so that a process is carried out with respect to a next piece of measured data.

Upon completion of processes for all pieces of measured data in the loop (2), the evaluating section 127 evaluates the histogram (S30).

Next, a next candidate for the zero-point offset becomes a target (L12), and the loop (1) is initiated from the beginning (L11).

Upon completion of the process for all the candidates for the zero-point offset, the process ends.

Embodiment 2

Figure 5:
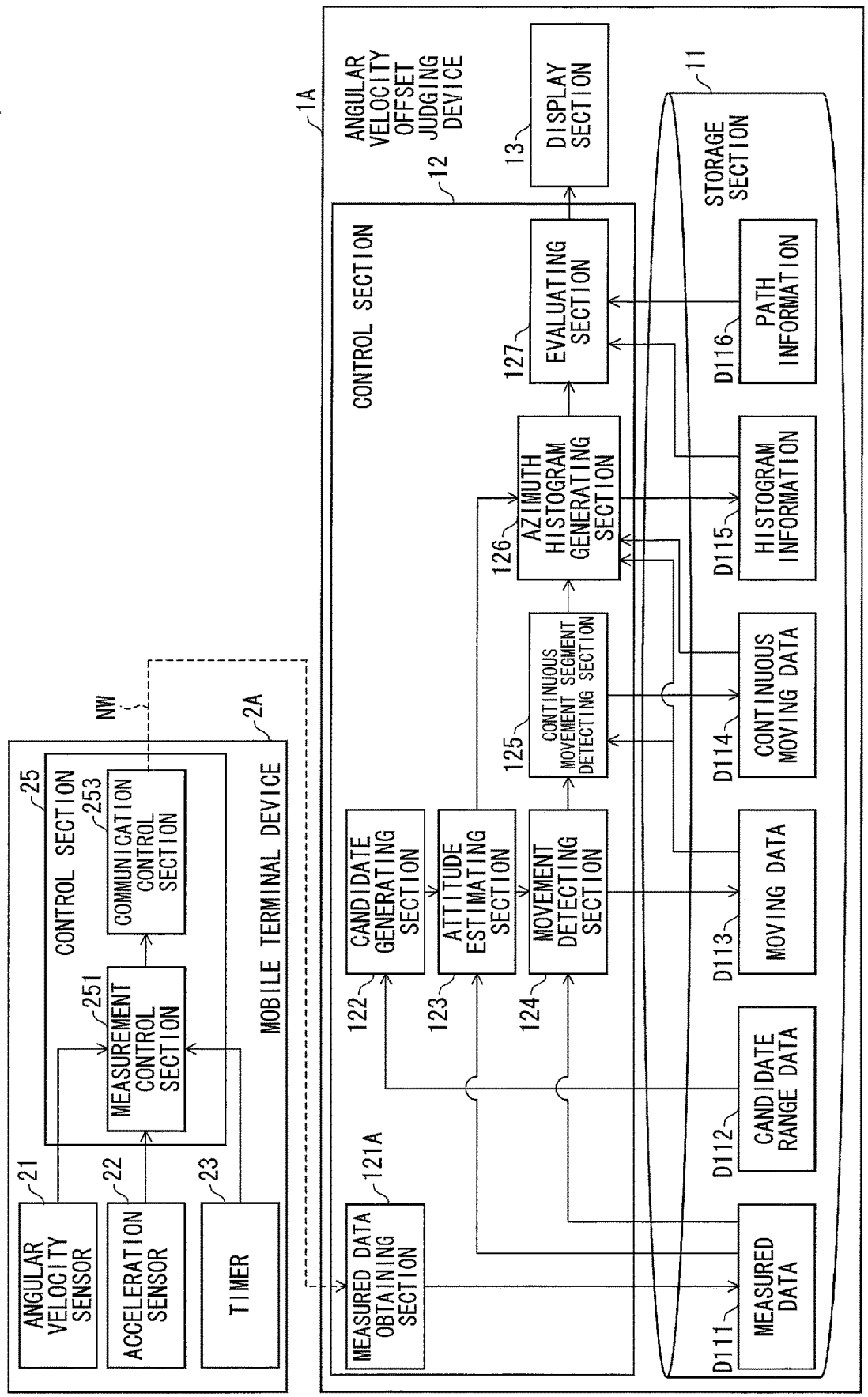
FIG. 5 is a functional diagram illustrating a configuration of a positioning system in accordance with another embodiment of the present invention.

The following description will discuss Embodiment 2 of the present invention with reference to FIG. 5. In Embodiment 2, for convenience, members identical in function to those described above are given the same reference numerals, and their descriptions will be omitted.

A positioning system SYS1A illustrated in FIG. 5 includes a mobile terminal device 2A and an angular velocity offset judging device 1A.

The mobile terminal device 2A and the angular velocity offset judging device 1A are connected to each other via a communications network NW. Examples of the communications network NW encompass wireless networks such as an IEEE802.11 wireless network and a mobile phone network. Further examples of the communications network NW encompass wired communications networks such as an Ethernet (registered trademark) network.

The mobile terminal device 2A also serves as a data measuring probe. Specifically, the mobile terminal device 2A transmits, as needed, measured data to the angular velocity offset judging device 1A via the communications network NW.

The following description will discuss, in detail, a difference between the positioning system SYS1 illustrated in FIG. 1 and the positioning system SYS1A illustrated in FIG. 5.

The mobile terminal device 2A of the positioning system SYS1A is different from the mobile terminal device 2 of the positioning system SYS1 in that (i) the mobile terminal device 2A does not include the storage section 24 included in the mobile terminal device 2 and (ii) the mobile terminal device 2A includes a communication control section 253 instead of the connection control section 252 which is included in the mobile terminal device 2.

The communication control section 253 transmits, as needed, pieces of measured data to the angular velocity offset judging device 1A via the communications network NW. The pieces of measured data have been measured by respective of (i) an angular velocity sensor 21, (ii) an acceleration sensor 22, and (iii) a timer 23.

In addition, the angular velocity offset judging device 1A of the positioning system SYS1A is different from the angular velocity offset judging device 1 of the positioning system SYS1 in that the angular velocity offset judging device 1A includes a measured data obtaining section 121A instead of the measured data obtaining section 121 which is included in the angular velocity offset judging device 1A.

The measured data obtaining section 121A obtains, via the communications network NW, the measured data which has been transmitted as needed from the mobile terminal device 2A.

The positioning system SYS1A is thus configured so that the mobile terminal device 2A transmits, as needed, measured data to the velocity offset judging device 1A. In the above configuration, a storage section for storing measured data is omitted from the mobile terminal device 2A. Therefore, even in a case where the mobile terminal device 2A is obtained by a third party, measured data will never be obtained by the third party. This can prevent unwanted disclosure of measured data from occurring as a result of loss or theft of the mobile terminal device 2A.

According to the above description, the positioning system SYS1A is configured so that the mobile terminal device 2A and the angular velocity offset judging device 1A have a one-to-one correspondence. Note, however, that the configuration of the positioning system SYS1A is not limited as such. For example, a single angular velocity offset judging device 1A can be provided for a plurality of mobile terminal devices 2A. In addition, the angular velocity offset judging device 1A can further an estimated azimuth output section 130 and a location estimating section 131 as does the angular velocity offset judging device 1.

Embodiment 3

Figure 6:
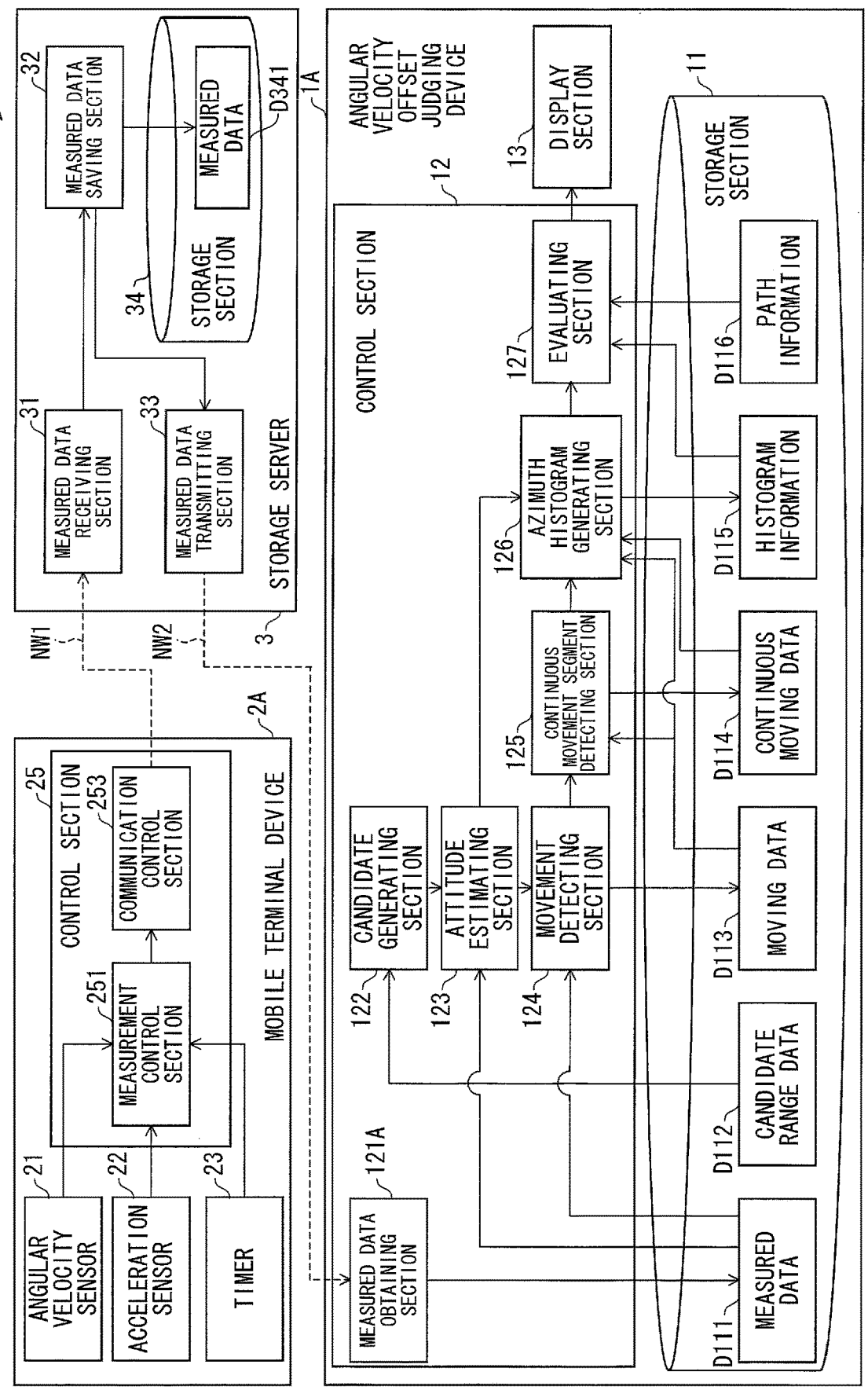
FIG. 6 is a functional diagram illustrating a configuration of a positioning system in accordance with another embodiment of the present invention.

The following description will discuss Embodiment 3 of the present invention with reference to FIG. 6. In Embodiment 3, for convenience, members identical in function to those described above are given the same reference numerals, and their descriptions will be omitted.

A positioning system SYS1B illustrated in FIG. 6 includes a mobile terminal device 2A, a storage server 3, and an angular velocity offset judging device 1A.

That is, according to the positioning system SYS of FIG. 6, the storage server 3 is further provided between the mobile terminal device 2A and the angular velocity offset judging device 1A which are included in the positioning system SYS1A illustrated in FIG. 5. The storage server 3 connects the mobile terminal device 2A and the angular velocity offset judging device 1A.

Note that according to the positioning system SYS1B of FIG. 6, (i) the mobile terminal device 2A transmits data to the storage server 3 and (ii) the angular velocity offset judging device 1 obtains measured data from the storage server 3.

The storage server 3 includes a measured data receiving section 31, a measured data saving section 32, a measured data transmitting section 33, and a storage section 34.

The measured data receiving section 31 (i) receives measured data which has been transmitted from the mobile terminal device 2A via a network NW1 and then (ii) supplies the measured data to the measured data saving section 32.

The measured data saving section 32 stores the measured data D341 in the storage section 34.

The measured data transmitting section 33 reads out the measured data from the storage section 34 (i) at a predetermined timing or (ii) in response to a request from the angular velocity offset judging device 1. Then, the measured data transmitting section 33 transmits, via a network NW2, the measured data thus read out to the angular velocity offset judging device 1.

Note that the predetermined timings can come at regular or irregular intervals. Alternatively, the predetermined timings can each be a timing at which the number of pieces of measured data has become a predetermined number or more.

The measured data storage section 34 stores measured data, and can be realized by a hard disk, an SSD (Solid State Drive), or the like.

As is clear from above, the positioning system SYS1B employs a form of what is known as cloud computing. With the above configuration, it is possible, as is the case of Embodiment 2, to prevent unwanted disclosure of measured data from occurring as a result of loss or theft of the mobile terminal device 2A.

Embodiment 4

Figure 7:
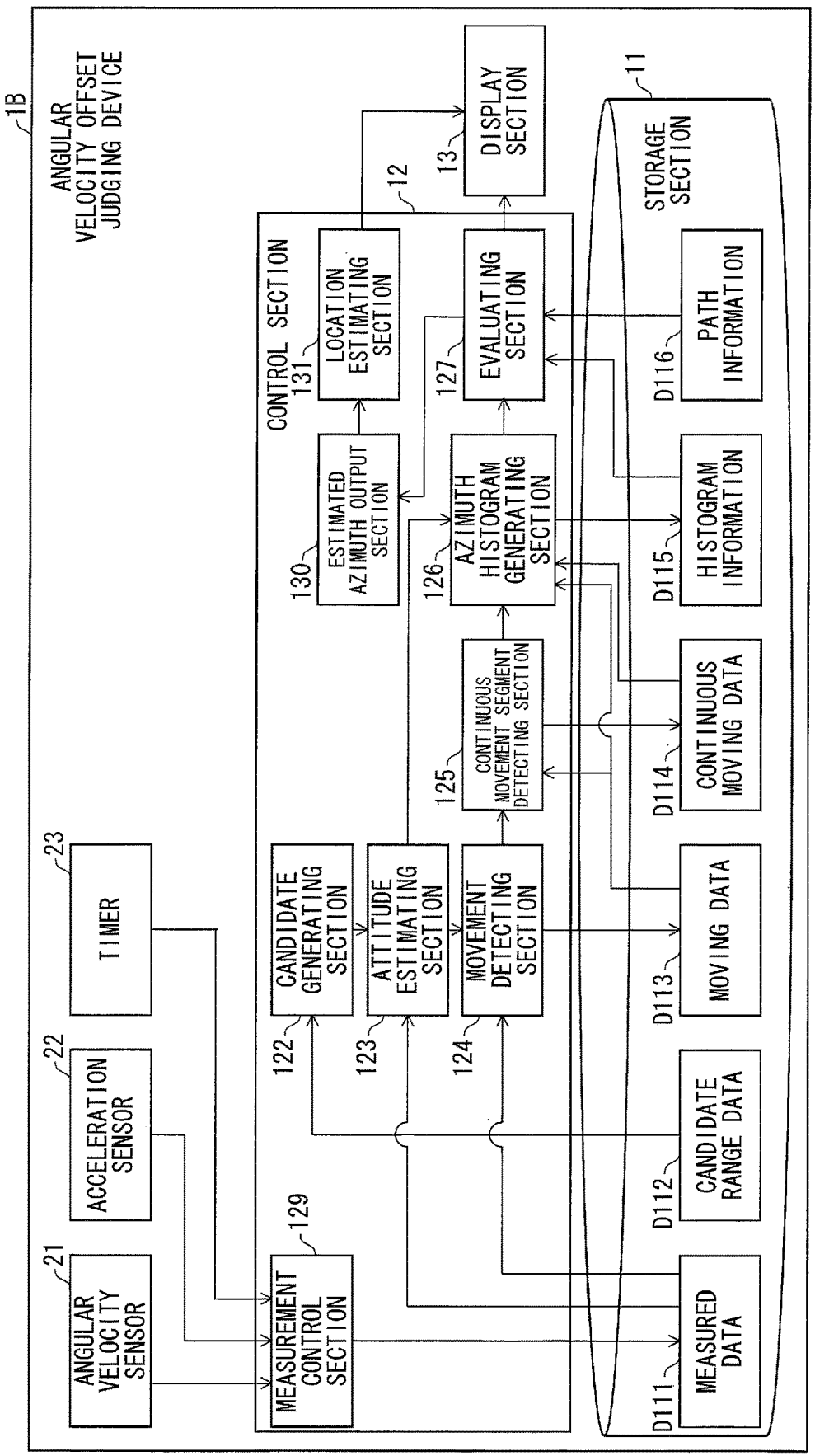
FIG. 7 is a functional diagram illustrating a configuration of a positioning system in accordance with another embodiment of the present invention.

The following description will discuss Embodiment 4 of the present invention with reference to FIG. 7. In Embodiment 4, for convenience, members identical in function to those described above are given the same reference numerals, and their descriptions will be omitted.

An angular velocity offset judging device 1B illustrated in FIG. 7 (i) makes a measurement of an angular velocity vector and an acceleration vector, (ii) makes an attitude estimate in accordance with measured data obtained by the measurement, and (iii) judges validity of a result of the attitude estimate.

The angular velocity offset judging device 1B includes sensor modules such as an angular velocity sensor and an acceleration sensor. The angular velocity offset judging device 1B can be realized by a multifunctional mobile device (e.g. tablet PC, smartphone) in which an application program is installed for making an attitude estimate and for judging validity of a result of the attitude estimate.

The angular velocity offset judging device 1B is obtained by combining and making a change to the mobile terminal device 2 and the angular velocity offset judging device 1 which are illustrated in FIG. 1.

Specifically, the angular velocity offset judging device 1B is configured so that, in the angular velocity offset judging device 1 of FIG. 1, (i) an angular velocity sensor 21, an acceleration sensor 22, and a timer 23 are further provided and (ii) the measured data obtaining section 121 is replaced with a measurement control section 129.

The measurement control section 129 (i) obtains pieces of output data from respective of the angular velocity sensor 21, the acceleration sensor 22, and the timer 23 and (ii) stores, in the storage section 24, the pieces of output data so as to be associated with each other.

The other members are similar to those included in the angular velocity offset judging device 1 of FIG. 1, and therefore their descriptions will be omitted.

With the above configuration, the angular velocity offset judging device 1B taken along by a moving body can make (i) a measurement, (ii) an attitude estimate, and (ii) a judgment with regard to validity of a result of the attitude estimate. In a case where the angular velocity offset judging device 1B is realized by a smartphone or the like, an owner of the smartphone can check, on the spot, the validity of the result of the attitude estimate.

Embodiment 5

Figure 8:
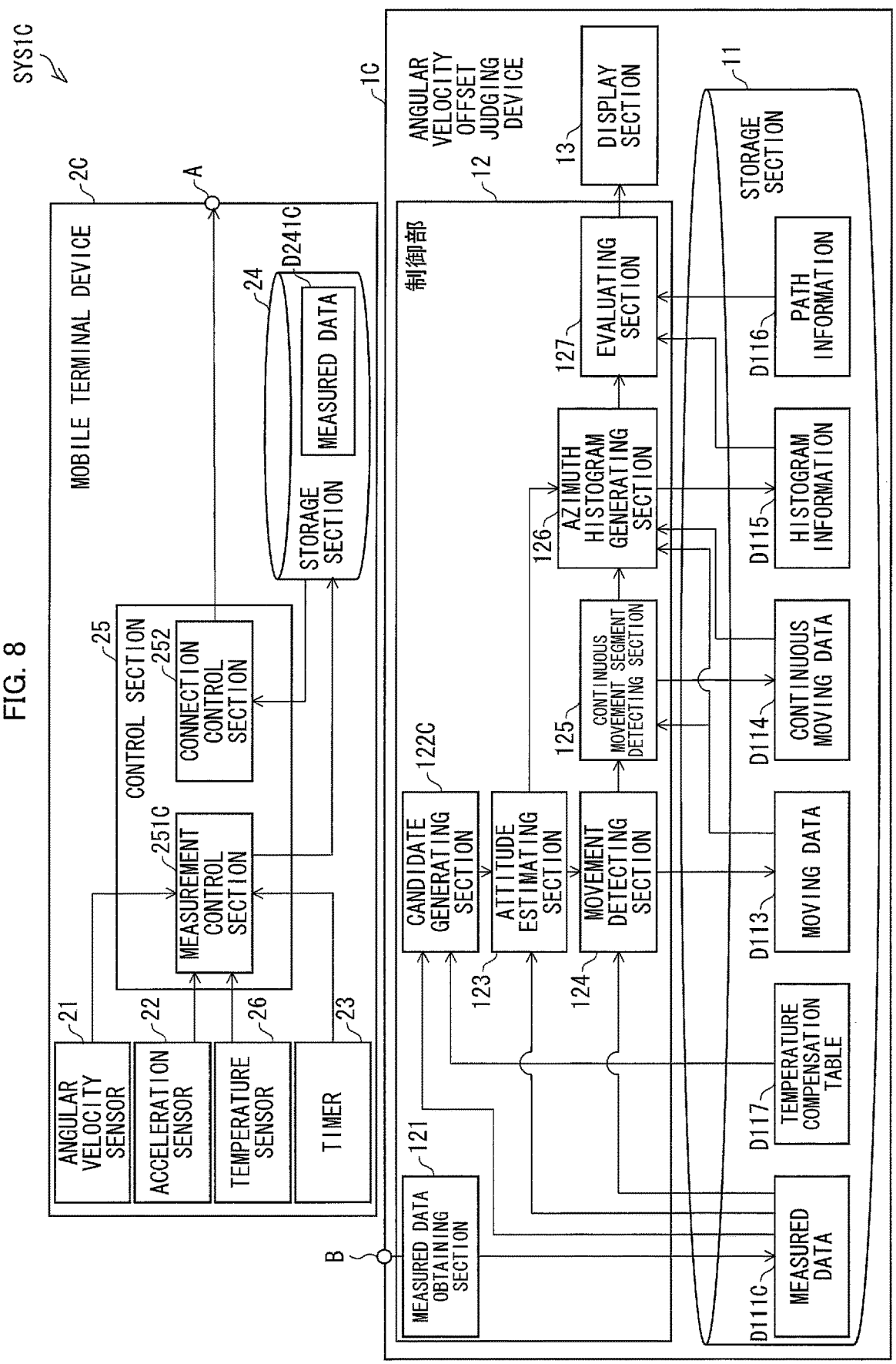
FIG. 8 is a functional diagram illustrating a configuration of a positioning system in accordance with another embodiment of the present invention.

The following description will discuss Embodiment 5 of the present invention with reference to FIG. 8. In Embodiment 5, for convenience, members identical in function to those described above are given the same reference numerals, and their descriptions will be omitted.

A positioning system SYS1C, illustrated in FIG. 8, includes a mobile terminal device 2C and an angular velocity offset judging device 1C. Note that, as with the angular velocity offset judging device 1, the angular velocity offset judging device 1C can also include an estimated azimuth output section 130 and a location estimating section 131.

According to the positioning system SYS1C, (i) a measurement of temperatures is made by a sensor and (ii) a range of a zero-point offset is identified in accordance with the measurement.

More specifically, temperatures are measured by the mobile terminal device 2C. Then, a range of a zero-point offset is identified by the angular velocity offset judging device 1C in accordance with the temperatures thus measured. Then, candidates for the zero-point offset are generated.

The following description will discuss, in more detail, a difference between (i) the mobile terminal device 2C and the angular velocity offset judging device 1C which are included in the positioning system SYS of FIG. 8 and (ii) the mobile terminal device 2 and the angular velocity offset judging device 1 which are included in the positioning system SYS1 of FIG. 1.

(Mobile Terminal Device)

The mobile terminal device 2C is configured so that in the mobile terminal device 2 illustrated in FIG. 1, (i) a temperature sensor 26 is further provided and (ii) the measurement control section 251 is replaced with a measurement control section 251C. Note that data to be stored in a storage section 24 of the mobile terminal device 2C is measured data D241C instead of measured data D241.

The temperature sensor 26 measures a temperature in the vicinity of the mobile terminal device 2C (i.e. in the vicinity of the angular velocity sensor 21).

The measurement control section 251C (i) obtains pieces of output data from respective of the angular velocity sensor 21, the acceleration sensor 22, a temperature sensor 26, and the timer 23, and (ii) controls the storage section 24 to store the measured data D241C with which the pieces of output data thus obtained are associated.

In response to a connection of the mobile terminal device 2C to the angular velocity offset judging device 1C via an external connection interface A, the connection control section 252 transmits, to the angular velocity offset judging device 1C, measured data D241C which is stored in the storage section 24.

(Angular Velocity Offset Judging Device)

The angular velocity offset judging device 1C is configured so that in the angular velocity offset judging device 1C illustrated in FIG. 1, the candidate generating section 122 is replaced with a candidate generating section 122C.

Note that the storage section 11 (i) stores measured data D111C instead of measured data D111 and (ii) stores temperature compensation table D117 instead of candidate range data D112.

The following description will discuss how candidates for a zero-point offset are generated by the candidate generating section 122C.

An angular velocity sensor has a characteristic in which a characteristic of a zero-point offset changes depending on a temperature. The temperature compensation table D117 (i) indicates such a characteristic of the angular velocity sensor and (ii) associates temperatures with respective ranges of zero-point offset.

The candidate generating section 122C identifies a range of zero-point offset by using temperatures contained in measured data D111C, while referring to the temperature compensation table D117.

Ten (10) candidates can be obtained, in a case where (i) a range of zero-point offsets, which are outputted from an angular velocity sensor in a yaw azimuth, can be narrowed down to a range of ±0.005 [rad/s] in accordance with the associations made in the temperature compensation table D117 and (ii) the zero-point offset is estimated with a resolution of 0.001 [rad/s]. This means that it is only necessary to evaluate 10 zero-point offsets at most.

The following description will further discuss the above case with reference to FIG. 4. In the above case, the number of candidates for the zero-point offset can be narrowed down to 10 in the step S11. This means that 10 candidates for the zero-point offset are proceeded with at step L1 in the loop (1). Note that it is possible to make an estimate of the zero-point offset with respect to each of the axes of the three-axis angular velocity sensor.

With the above configuration, it is possible to narrow down a range of candidates for the zero-point offset. It is therefore possible to efficiently make an estimate of the zero-point offset.

In the description in Embodiment 5, the positioning system SYS is a variation of the positioning system SYS1 of Embodiment 1. Note, however, that Embodiment 5 is not limited as such. Alternatively, the positioning system SYS of Embodiment 5 can be a variation of the positioning systems of Embodiments 2 through 4 so that candidates for a zero-point offset are narrowed down by use of temperature.

SOFTWARE IMPLEMENTATION EXAMPLE

Control blocks of each of the mobile terminal devices 2, 2A, 2C, the angular velocity offset judging devices 1, 1A, 1B, 1C, and the storage server 3 may be realized by a logic circuit (hardware) provided in an integrated circuit (IC chip) or the like or may be realized by software as executed by a CPU (Central Processing Unit).

In the latter case, each of the devices includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

The present invention is not limited to the embodiments, but can be altered by a skilled person in the art within the scope of the claims. An embodiment derived from a proper combination of technical means each disclosed in a different embodiment is also encompassed in the technical scope of the present invention.

SUMMARY

An estimated azimuth evaluating device of the present invention includes: an angular velocity obtaining section for obtaining an angular velocity around a gravity axis during a movement of a moving body, which angular velocity has been measured by a three-axis angular velocity sensor; a bias component candidate generating section for generating a candidate for a bias component of the three-axis angular velocity sensor; an estimating section for estimating an estimated azimuth of the movement of the moving body in accordance with (i) the angular velocity obtained by the angular velocity obtaining section and (ii) the candidate for the bias component; an appearance frequency obtaining section for obtaining an appearance frequency of estimated azimuths; and an evaluating section for making an evaluation of whether or not the appearance frequency obtained by the appearance frequency obtaining section shows a tendency which is observed in a case where an azimuth is properly estimated under a binding condition concerning an advancing direction of the movement of the moving body.

An estimated azimuth evaluating device controlling method of the present invention includes: (a) obtaining an angular velocity around a gravity axis during a movement of a moving body, which angular velocity has been measured by a three-axis angular velocity sensor; (b) generating a candidate for a bias component of the three-axis angular velocity sensor; (c) estimating an estimated azimuth of the movement of the moving body in accordance with (i) the angular velocity obtained in the step (a) and (ii) the candidate for the bias component; (d) obtaining an appearance frequency of the estimated azimuth; and (e) making an evaluation of whether or not the appearance frequency obtained in the step (d) shows a tendency which is observed in a case where an azimuth is properly estimated under a binding condition concerning an advancing direction of the movement of the moving body.

In the above description, the moving body refers to an object or the like whose movement can be detected. Examples of the object encompass persons and vehicles. According to the above configuration, the appearance frequency of the estimated azimuths is obtained by applying a bias component candidate to an angular velocity around a gravity axis, which angular velocity has been measured during the movement of the moving body. In other words, the bias component is applied to angular velocities measured at respective time points (i.e. the angular velocities are calibrated by the bias component). Then, estimated azimuths are calculated by use of the angular velocities to which the bias component has been applied (i.e. the angular velocities calibrated by the bias component). Then, a frequency distribution is obtained in accordance with the estimated azimuths thus calculated.

A bias component is an error component outputted from an angular velocity sensor while a value of zero should be outputted. A bias component is also referred to as a zero-point offset. In the above configuration, candidates for a bias component to be evaluated are generated.

The above measurement only needs to be carried out so that a movement can be detected in predetermined units. For example, the above measurement can be made over a predetermined period of time, or made a predetermined number of times for sampling. For example, in a case where the moving body is a person and a movement is a walking motion, the measurement can be made so that a walking motion of approximately 1,000 steps can be detected.

According to the above configuration, it is evaluated whether or not the appearance frequency of the estimated azimuths shows a tendency which is observed in a case where the azimuth is properly estimated under a binding condition concerning an advancing direction of the moving body, that is, under a geographical binding condition during the movement of the moving body.

The binding condition concerning the advancing direction of the movement of the moving body is a restriction on a direction of the movement of the moving body. Examples of the binding condition encompass (i) how paths are arranged and (ii) how the paths are connected to each other. In general office environment, factory, and living environment, paths on which it is possible to move by walking are often arranged systematically. Examples of such environments encompass (i) paths which are orthogonal to each other and (ii) crossroads, T-junctions, and corners bending at a 90-degree angle.

The tendency observed in a case where the azimuth is properly estimated is a tendency of an azimuth that should appear in a case where a moving body moves under a geographical binding condition.

For example, in a case where a moving body moves at crossroads at which paths are orthogonally connected to each other, the moving body is supposed to move in any one of forward, rightward, leftward, and backward directions. Therefore, an appearance frequency of the direction of the movement of the moving body (i.e. appearance frequency of azimuths) should become high in the forward, rightward, leftward, and backward directions.

According to the above configuration, it is evaluated whether or not the appearance frequency of the estimated azimuths shows such a tendency. The evaluation can be made by, for example, evaluating kurtosis of a histogram that represents the appearance frequency. In the above example of the crossroads, occurrence rates corresponding to the respective forward, rightward, leftward, and backward directions should become high in the histogram that represents the appearance frequency.

For example, if the histogram does not show the above tendency, then it can be said that an estimated azimuth is low in accuracy. In other words, in such a case, an error component (bias component) used for obtaining the estimated azimuth is not proper.

In a case where such a tendency of appearance frequency is evaluated, it is possible to bring about an effect of being able to evaluate validity of an error component (bias component) of an estimated angular velocity even without measuring the error component in advance.

The estimated azimuth evaluating device of the present invention is preferably configured to further include: a movement detecting section for detecting that the moving body is making a movement, the appearance frequency obtaining section being configured to obtain appearance frequency of the estimated azimuths during which the movement of the moving body is continuous.

According to the above configuration, part of the appearance frequency of the estimated azimuths, which part concerns the segment during which the movement of the moving body is continuous, is obtained. This makes it possible to eliminate noise that occurs in a case where the movement is sporadic, and therefore allows for an increase in accuracy of the evaluation.

The estimated azimuth evaluating device of the present invention is preferably configured to further include: a gravity axis judging section for judging, in accordance with an acceleration measured by an acceleration sensor, whether or not any one of axes of the three-axis angular velocity sensor matches the gravity axis during the movement of the moving body, of angular velocities measured by the three-axis angular velocity sensor, an angular velocity measured while the any one of the axes matches the gravity axis being used (i.e. angular velocity measured by the angular velocity sensor whose axis matches the gravity axis).

According to the above configuration, (i) it is judged whether or not any one of the axes of the three-axis angular velocity sensor matches the gravity axis and (ii) an angular velocity, which is measured while the any one of the axes matches the gravity axis, is used. This allows the azimuth to be estimated simply and accurately in accordance with the angular velocity around a gravity axis.

The estimated azimuth evaluating device of the present invention is preferably configured such that the evaluating section makes the evaluation by evaluating kurtosis of a histogram which represents the appearance frequency obtained by the appearance frequency obtaining section.

With the above configuration, it is possible evaluate the tendency of the appearance frequency with relative ease.

The estimated azimuth evaluating device of the present invention is preferably configured such that: the bias component candidate generating section generates a plurality of candidates for the bias component; the estimating section estimates an estimated azimuth of the movement of the moving body in accordance with each of the plurality of candidates; the appearance frequency obtaining section obtains an appearance frequency of the estimated azimuths thus estimated; and the evaluating section makes an evaluation of whether or not the appearance frequency thus obtained shows a tendency which is observed in a case where an azimuth is properly estimated under a binding condition concerning an advancing direction of the movement of the moving body.

According to the above configuration, the appearance frequency of estimated azimuths with respect to the respective plurality of candidates for the bias component is evaluated. This makes it possible to evaluate which of the plurality of candidates for the bias component is proper.

The estimated azimuth evaluating device of the present invention is preferably configured such that the bias component candidate generating section generates the plurality of candidates in accordance with a temperature measured in the vicinity of the three-axis angular velocity sensor.

A bias component of an angular velocity sensor is correlated with a temperature in the vicinity of the angular velocity sensor. According to the above configuration, a plurality of candidates for a bias component are generated in accordance with such a correlation. This allows the candidates for the bias component to be narrowed down with increased accuracy, and therefore prevents an unnecessary evaluation from being made.

The estimated azimuth evaluating device of the present invention is preferably configured to further include: an estimated azimuth output section for outputting an estimated azimuth in accordance with a result of the evaluation.

With the above configuration, it is possible to output an estimated azimuth with high accuracy.

The estimated azimuth evaluating device of the present invention is preferably configured to further include: a location estimating section for estimating a location of the moving body in accordance with the estimated azimuth outputted from the estimated azimuth output section.

With the above configuration, it is possible to estimate the location of the moving body with higher accuracy.

The estimated azimuth evaluating device of the present invention is preferably configured such that the movement of the moving body is a walking motion.

With the above configuration, it is possible to evaluate, with higher accuracy, validity of an error component of an angular velocity during a walking motion of a pedestrian (e.g. a person or a walking robot). This allows the estimated azimuth evaluating device to be suitably applied to, for example, an estimation of a location of the pedestrian.

The scope of the present invention also encompasses a mobile terminal device including: a three-axis angular velocity sensor; the above-described estimated azimuth evaluating device; and a location estimating section for estimating a location of a moving body.

The estimated azimuth evaluating device in accordance with each of the embodiments of the present invention can be realized by a computer. In such a case, the scope of the present invention also encompasses (i) an estimated azimuth evaluating device control program which allows the estimated azimuth evaluating device to be realized by the computer through causing the computer to operate as each of the sections included in the estimated azimuth evaluating device and (ii) a computer-readable storage medium in which the control program is stored.

INDUSTRIAL APPLICABILITY

With the present invention, it is possible to properly set a zero-point offset. This allows a moving direction of a person, who moves by walking, to be estimated with high accuracy. Therefore, the present invention is suitable for, for example, a navigation device which displays a current location on a map.

REFERENCE SIGNS LIST 1, 1A, 1B, 1C Angle offset judging device (estimated azimuth evaluating device)
11 Storage section
12 Control section
121, 121A Measured data obtaining section
122, 122C Candidate generating section (bias component candidate generating section)
123 Attitude estimating section (estimating section)
124 Movement detecting section (estimating section)
125 Continuous movement segment detecting section (movement detecting section)
126 Azimuth histogram generating section (appearance frequency obtaining section)
127 Evaluating section (estimated azimuth output section)
129 Measurement control section
130 Estimated azimuth output section
131 Location estimating section
13 Display section
2, 2A, 2C Mobile terminal device
21 Angular velocity sensor
22 Acceleration sensor
23 Timer
25 Control section
251, 251C Measurement control section
252 Connection control section
253 Communication control section
26 Temperature sensor
D111, D111C Measured data
D115 Histogram information
D117 Temperature compensation table
SYS1, SYS1A, SYS1B, SYS1C Positioning system

The invention claimed is:

1. A mobile device comprising:
a three-axis angular velocity sensor configured to measure angular velocity;
memory; and
a processor configured to:
  detect that a moving body is making a movement;
  during the movement of the moving body over a period of the movement, receive from the three-axis angular velocity sensor a plurality of angular velocities around a gravity axis;
  generate a plurality of offset value candidates for an offset value to be used for calibrating the plurality of angular velocities, each of the offset value candidates being within a predetermined numerical range;
  carry out the following processing (1) to (4) with respect to each of the plurality of offset value candidates:
    (1) estimating azimuths of the movement of the moving body during the period of movement in accordance with (i) the plurality of angular velocities obtained and (ii) a respective one of the plurality of candidates;
    (2) obtaining an appearance frequency of values of the estimated azimuths during the period of movement when the movement of the moving body is continuous;
    (3) generating a histogram which represents the appearance frequency thus obtained; and
    (4) evaluation of whether or not the histogram shows a tendency which is observed in a case where an azimuth is properly estimated under a binding condition concerning an advancing direction of the movement of the moving body,
  based on the evaluation select from among the plurality of offset value candidates an offset value candidate to be used for calibrating the plurality of angular velocities;
  calibrate an output of the three-axis angular velocity sensor by applying the selected offset value candidate to the plurality of angular velocities received from the three-axis angular velocity sensor; and
  estimate a position of the moving body based on the calibrated output of the three-axis angular velocity sensor.

2. The mobile device as set forth in claim 1, wherein:
the processor is further configured to judge, in accordance with an acceleration measured by an acceleration sensor, whether or not any one of axes of the three-axis angular velocity sensor matches the gravity axis during the movement of the moving body,
of angular velocities measured by the three-axis angular velocity sensor, an angular velocity measured while the any one of the axes matches the gravity axis being used for estimating an azimuth of the movement of the moving body.

3. The mobile device as set forth in claim 1, wherein the processor is configured to make the evaluation by evaluating kurtosis of the histogram which represents the obtained appearance frequency.

4. The mobile device as set forth in claim 1, wherein the processor is further configured to generate the plurality of offset value candidates in accordance with a temperature measured in a vicinity of the three-axis angular velocity sensor.

5. The mobile device as set forth in claim 1, wherein the processor is further configured to:
output an estimated azimuth in accordance with a result of the evaluation.

6. The mobile device as set forth in claim 5, wherein the processor is further configured to:
estimate a location of the moving body in accordance with the outputted estimated azimuth.

7. The mobile device as set forth in claim 1, wherein the movement of the moving body is a walking motion.

8. A non-transitory computer-readable storage medium including a program that, when executed by the processor of the mobile device of claim 1, causes the processor to perform the processing (1) to (4) set forth in claim 1.

9. A method of controlling a mobile device including a processor, memory, and a three-axis angular velocity sensor configured to measure angular velocity, the method comprising:
  (a) detecting that a moving body is making a movement;
  (b) during the movement of the moving body over a period of the movement, the processor receiving from the three-axis angular velocity sensor a plurality of angular velocities around a gravity axis;
  (c) generating, using the processor, a plurality of offset value candidates for an offset value to be used for calibrating the plurality of angular velocities, each of the offset value candidates being within a predetermined numerical range;
  (d) carrying out, using the processor, the following processing (1) to (4) with respect to each of the plurality of offset value candidates:
    (1) estimating an estimated azimuth of the movement of the moving body during the period of movement in accordance with (i) the plurality of angular velocities obtained and (ii) a respective one of the plurality of candidates;
    (2) obtaining an appearance frequency of values of the estimated azimuth during the period of movement when the movement of the moving body is continuous;
    (3) generating a histogram which represents the appearance frequency thus obtained; and
    (4) making an evaluation of whether or not the histogram shows a tendency which is observed in a case where an azimuth is properly estimated under a binding condition concerning an advancing direction of the movement of the moving body;

based on the evaluation selecting, using the processor, from among the plurality of offset value candidates an offset value candidate to be used for calibrating the plurality of angular velocities;
calibrating, using the processor, an output of the three-axis angular velocity sensor by applying the selected offset value candidate to the plurality of angular velocities received from the three-axis angular velocity sensor; and
estimating, using the processor, a position of the moving body based on the calibrated output of the three-axis angular velocity sensor.

10. A positioning device for (i) estimating an azimuth of a moving body by use of an angular velocity measured by an angular velocity sensor, which azimuth indicates an advancing direction of the moving body and (ii) estimating a location of the moving body in accordance with the azimuth, said positioning device comprising:
  memory; and
  a processor configured to:
    detect that a moving body is making a movement;
    during the movement of the moving body over a period of the movement, receive from the angular velocity sensor a plurality of angular velocities around a gravity axis;
    generate a first candidate for an offset value to be used for calibrating the angular velocity sensor, the first candidate being within a predetermined numerical range;
    estimate azimuths of the movement of the moving body during the period of movement in accordance with (i) the plurality of angular velocities obtained and (ii) the first candidate;
    obtain an appearance frequency of the estimated azimuths when the movement of the moving body is continuous;
    generate a histogram which represents the appearance frequency thus obtained;
    when the histogram shows a tendency which is observed in a case where an azimuth is properly estimated under a predetermined binding condition concerning the advancing direction of the moving body:
      calibrate an output of the angular velocity sensor by applying the first candidate to the plurality of angular velocities received from the angular velocity sensor; and
      estimate the location of the moving body based on the calibrated output of the angular velocity sensor;
    when the histogram does not show the tendency:
      generate a second candidate, which is in the predetermined numerical range but differs from the first candidate;
      calibrate the output of the angular velocity sensor by applying the second candidate to the plurality of angular velocities received from the angular velocity sensor; and
      estimate the location of the moving body based on the calibrated output of the angular velocity sensor.

* * * * *